(12) United States Patent
Sands

(10) Patent No.: US 7,066,640 B2
(45) Date of Patent: Jun. 27, 2006

(54) BLENDER AND MUGS

(75) Inventor: Lenny Sands, Encino, CA (US)

(73) Assignee: Homeland Housewares, LLC, Los Angeles, CA (US)

( * ) Notice: Subject to any disclaimer, the term of this patent is extended or adjusted under 35 U.S.C. 154(b) by 150 days.

(21) Appl. No.: 10/824,531

(22) Filed: Apr. 13, 2004

(65) Prior Publication Data

US 2005/0047272 A1 Mar. 3, 2005

Related U.S. Application Data

(63) Continuation-in-part of application No. 10/649,757, filed on Aug. 26, 2003, now Pat. No. 6,817,750.

(51) Int. Cl.
*A47J 43/46* (2006.01)
*A47J 43/06* (2006.01)

(52) U.S. Cl. ........................ 366/205; 366/314

(58) Field of Classification Search ............... 366/199, 366/205, 206, 314; 241/282.1, 282.2; 99/348
See application file for complete search history.

(56) References Cited

U.S. PATENT DOCUMENTS

| | | | |
|---|---|---|---|
| 2,299,730 A | 10/1942 | Bornstein | |
| 3,064,949 A | 11/1962 | Dewenter | |
| 3,085,710 A | 4/1963 | McIlroy | |
| 3,315,946 A | 4/1967 | Nissman | |
| 3,704,864 A | 12/1972 | Lee | |
| 3,881,705 A | 5/1975 | Greenspan | |
| 4,480,926 A | 11/1984 | Lattery, Jr. et al. | |
| 4,487,509 A | 12/1984 | Boyce | |
| 4,708,487 A | 11/1987 | Marshall | |
| 4,889,248 A | 12/1989 | Bennett | |
| 5,720,552 A | 2/1998 | Schinglegger | |
| D470,050 S | 2/2003 | Renz et al. | |
| D487,668 S * | 3/2004 | Sands | D7/378 |
| 6,817,750 B1 * | 11/2004 | Sands | 366/205 |
| 2001/0036124 A1 | 11/2001 | Rubenstein | |
| 2005/0047272 A1 * | 3/2005 | Sands | 366/199 |
| 2005/0068847 A1 * | 3/2005 | Sands | 366/205 |
| 2006/0007779 A1 * | 1/2006 | Fernandez et al. | 366/206 |

FOREIGN PATENT DOCUMENTS

| | | | |
|---|---|---|---|
| JP | 5-199943 | * | 8/1993 |
| JP | 2003-259994 | * | 9/2005 |
| WO | 03/003888 | * | 1/2005 |
| WO | 03/005871 | * | 1/2005 |

* cited by examiner

*Primary Examiner*—Charles E. Cooley
(74) *Attorney, Agent, or Firm*—Cislo & Thomas LLP

(57) ABSTRACT

A blender system including a mixing base is capable of agitating the contents of a plurality of containers. The mixing base includes a rotating shaft, a recessed well, a pressure-actuated switch positioned about the periphery of the recessed well, and a locking groove. One container that may be used with the mixing base has an opening at one end and a base at a second end, where the base is tapered. The container also includes one or more locking members in spaced relation about the periphery of the container body. The container body may be provided with a handle. The container also includes a ring that is selectively attachable and removable from the periphery of the opening such that when the ring is coupled to the container, the user is able to drink from the container without spilling or dripping.

11 Claims, 7 Drawing Sheets

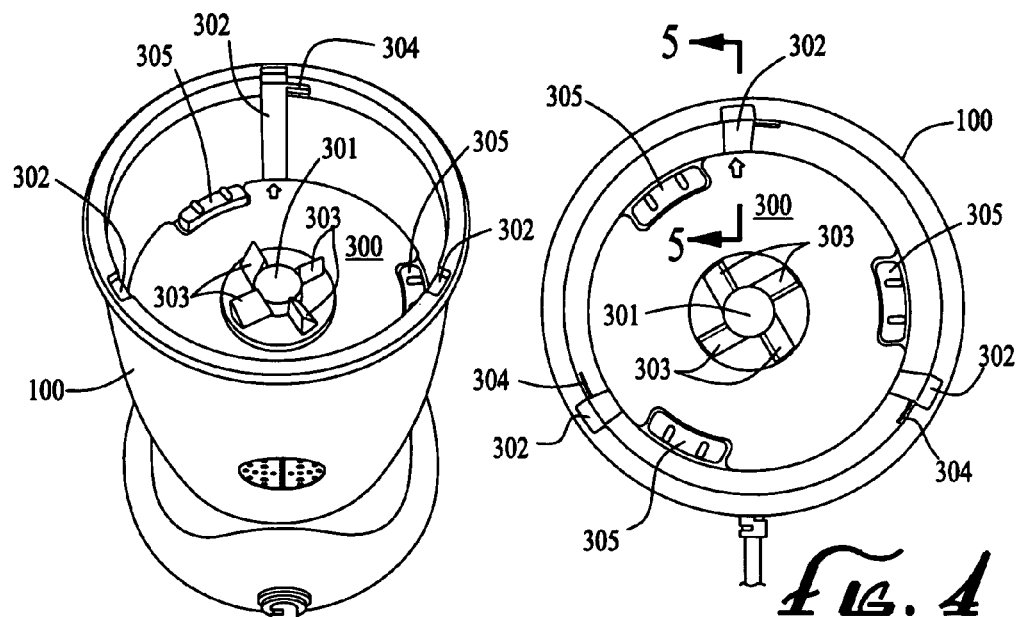
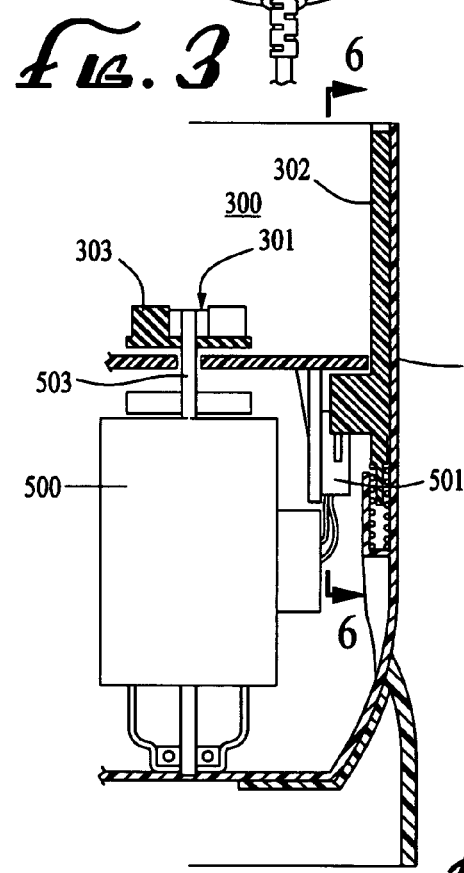

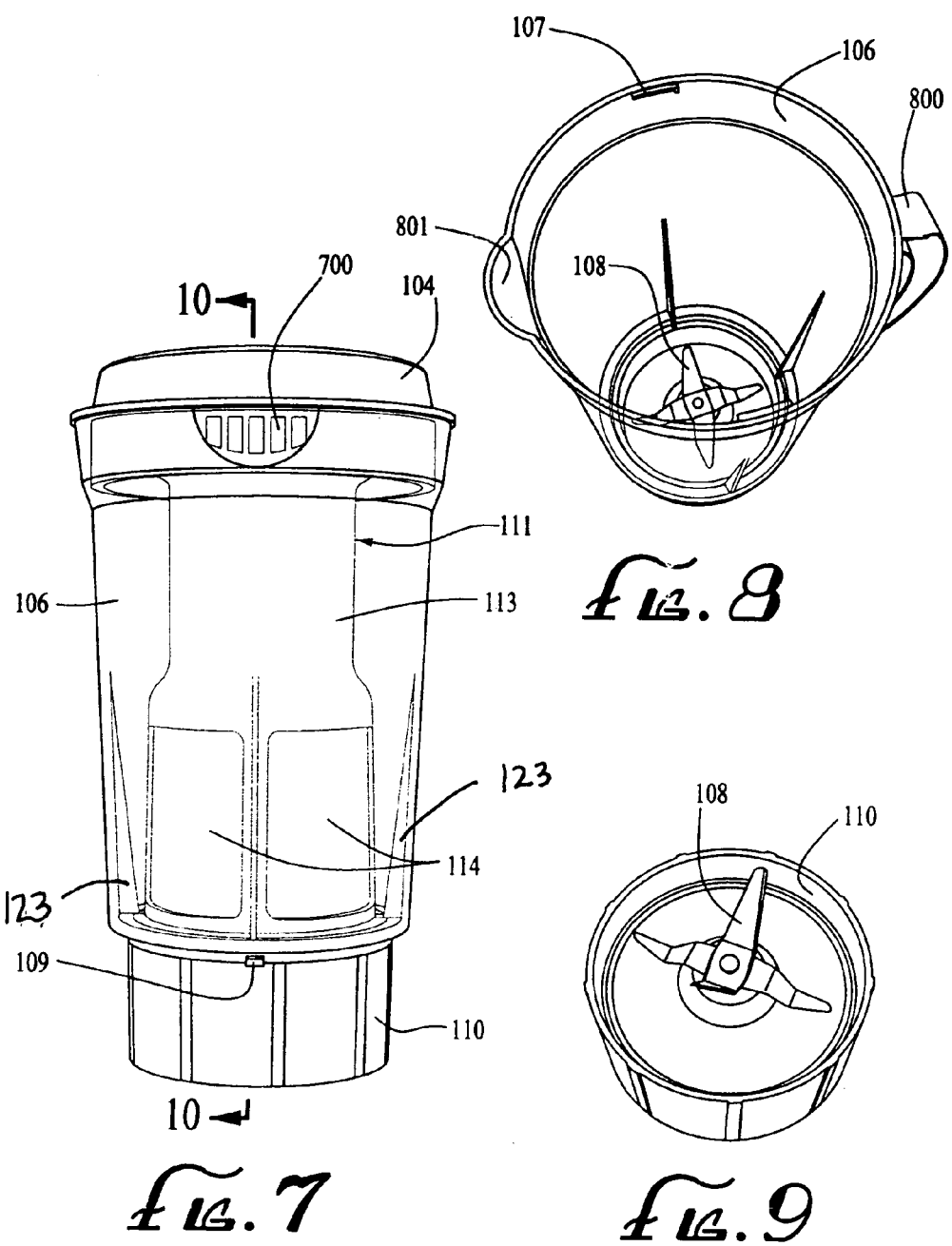

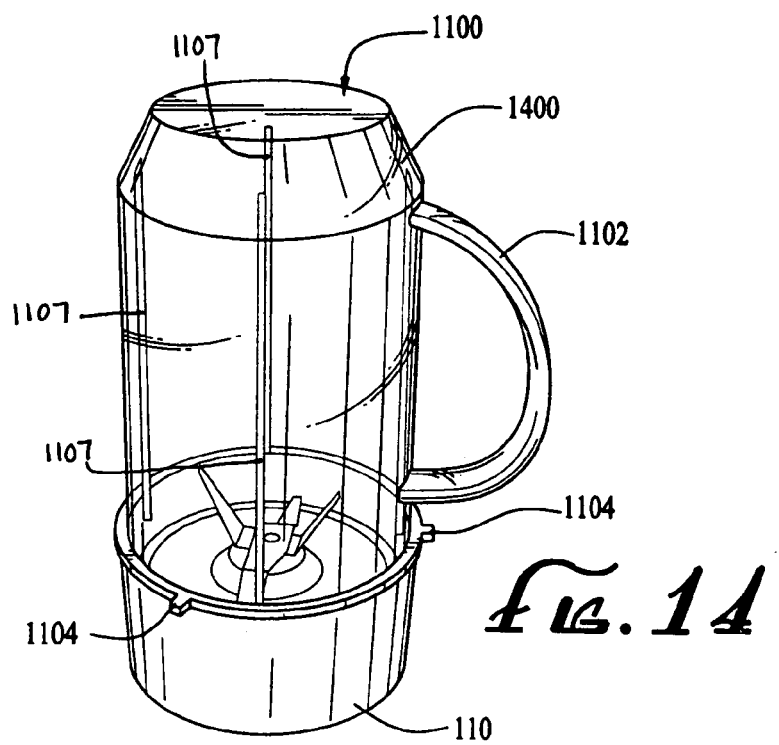
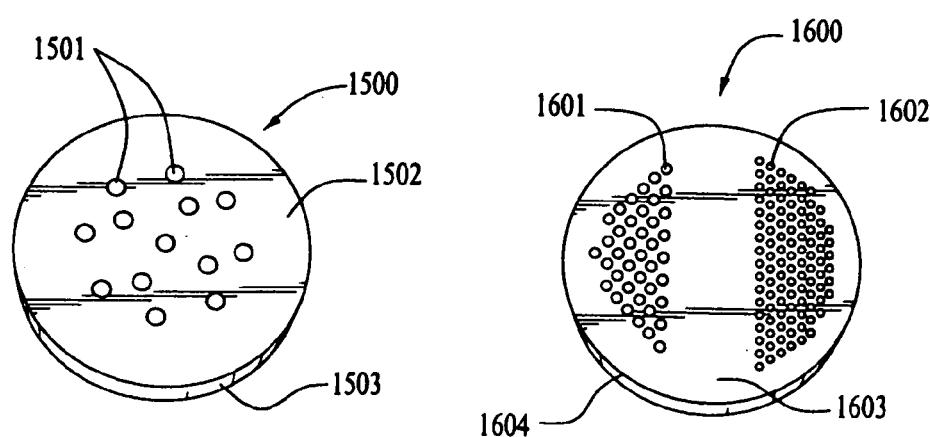

BLENDER AND MUGS

CROSS-REFERENCE TO RELATED APPLICATIONS

This utility patent application is a continuation-in-part of U.S. patent application Ser. No. 10/649,757, filed on Aug. 26, 2003, which issued as U.S. Pat. No. 6,817,750 B1 on Nov. 16, 2004, which is hereby incorporated in its entirety by reference.

BACKGROUND

Various devices for blending various liquids and solids have been developed over the years. These devices have various features and options to suit a wide variety of uses and applications. For example, there are many blenders that are either handheld or freestanding devices. While these devices have been useful, these prior art devices can be difficult to clean, use and store unused products, especially, when preparing smaller batches. More specifically, freestanding devices can be too large and cumbersome to use to make smaller portions and are generally better designed for blending larger quantities of fluids and ingredients. Handheld units may be useful to make individualized portions, but they may lack the power to properly blend ingredients together. Furthermore, these handheld units are generally used with open containers such as bowls or cups that can increase the chances of spilling or splattering during preparation of the ingredients. Moreover, the unused portion would have to be poured out of the open container and into a sealable container to be stored or to be readily carried by a person. Accordingly, there remains a need for an individualized blender system that may be easier to use, clean and store unused products.

SUMMARY

Exemplary embodiments disclosed here are directed to an individualized blender system. According to one exemplary embodiment, the blender system is composed of a base including a motor means, an individual-sized container and a combination blender and/or juicer canister. The base includes a body, a motor means, an agitating means coupled to the motor, a recessed well for receiving a container and a pressure-sensitive switch that selectively powers the motor means. In use, the container or canister may be placed on the base, pressure is applied to the container or canister thereby activating the motor means and agitating the contents of the container or canister. The base also includes a locking groove that permits the user to lock the container or canister on the base while keeping the motor means in the powered position.

According to one exemplary embodiment, the individually sized container may be bullet-shaped. In alternate embodiments, the container may have a cylindrical, polygonal, cubical, or pyramidal shape. Also, the container may be sealed with a simple cap or a cap having an agitating means. The container may also include a plurality of ridges that form a stable platform for standing the container like a typical drinking vessel. That is, the bullet-shape container may be inverted so that the container rests on the ridges, and the cap is readily accessible. Additionally, the container may include locking members that engage the locking grooves provided on the blender base.

According to one exemplary embodiment, the blender canister includes, at a minimum, a body, a selectively removable base having an agitating means, locking members that engage the locking grooves provided on the blender base and a selectively removable means for sieving the container contents. In use, with the sieving means provided in the body of the blender canister, fruits and vegetables may be placed and blended within the bore of the sieving means. The pulp remaining from the fruits and vegetables remain within the bore of the sieving means and the resultant juice may be decanted from the blender canister. Alternatively, the blender canister may be used without the removable means for sieving the container contents.

According to another embodiment, a container that may be used with a mixing base has an opening at one end and a base at a second end, where the second end is tapered. The container may also include one or more locking members in spaced relation about the periphery of the container body. The container body may also include a staying means that is coupled to the exterior of the container. The container may also include a ring that is selectively attachable and removable from the periphery of the opening such that when the ring is coupled to the container, the user is able to drink from the container without spilling or dripping.

Another embodiment is directed to caps that may be coupled to one or more of the containers disclosed herein. The cap may have a generally planar top surface and at least one sidewall. The cap may be secured over the openings of the container via one or more coupling means. The cap may also include openings that are spaced about the top of the container. The openings may have varying sizes, shapes, and density on the cap depending upon the intended or desired use.

BRIEF DESCRIPTION OF THE DRAWINGS

FIG. 3 is a perspective view of an exemplary embodiment of a blender base;

FIG. 4 is a top plan view of FIG. 3;

FIG. 5 is a cross-sectional view of an exemplary embodiment of a blender base taken along line 5—5 of FIG. 4;

FIG. 6 is a cross-sectional view of an exemplary embodiment of a blender base taken along line 6—6 of FIG. 5;

FIG. 7 is a side view of an exemplary embodiment of a blender container;

FIG. 8 is a perspective view of an exemplary embodiment of a blender container;

FIG. 9 is a perspective view of an exemplary embodiment of blender container base;

FIG. 14 is a perspective view of one embodiment of a mug that is coupled to a blender base;

FIG. 15 is a perspective view of a top for a blender container; and

FIG. 16 is another embodiment of a top for a blender container.

DETAILED DESCRIPTION

The detailed description set forth below in connection with the appended drawings is intended as a description of exemplary embodiments and is not intended to represent the only forms in which the exemplary embodiments may be constructed and/or utilized.

Figure 1:
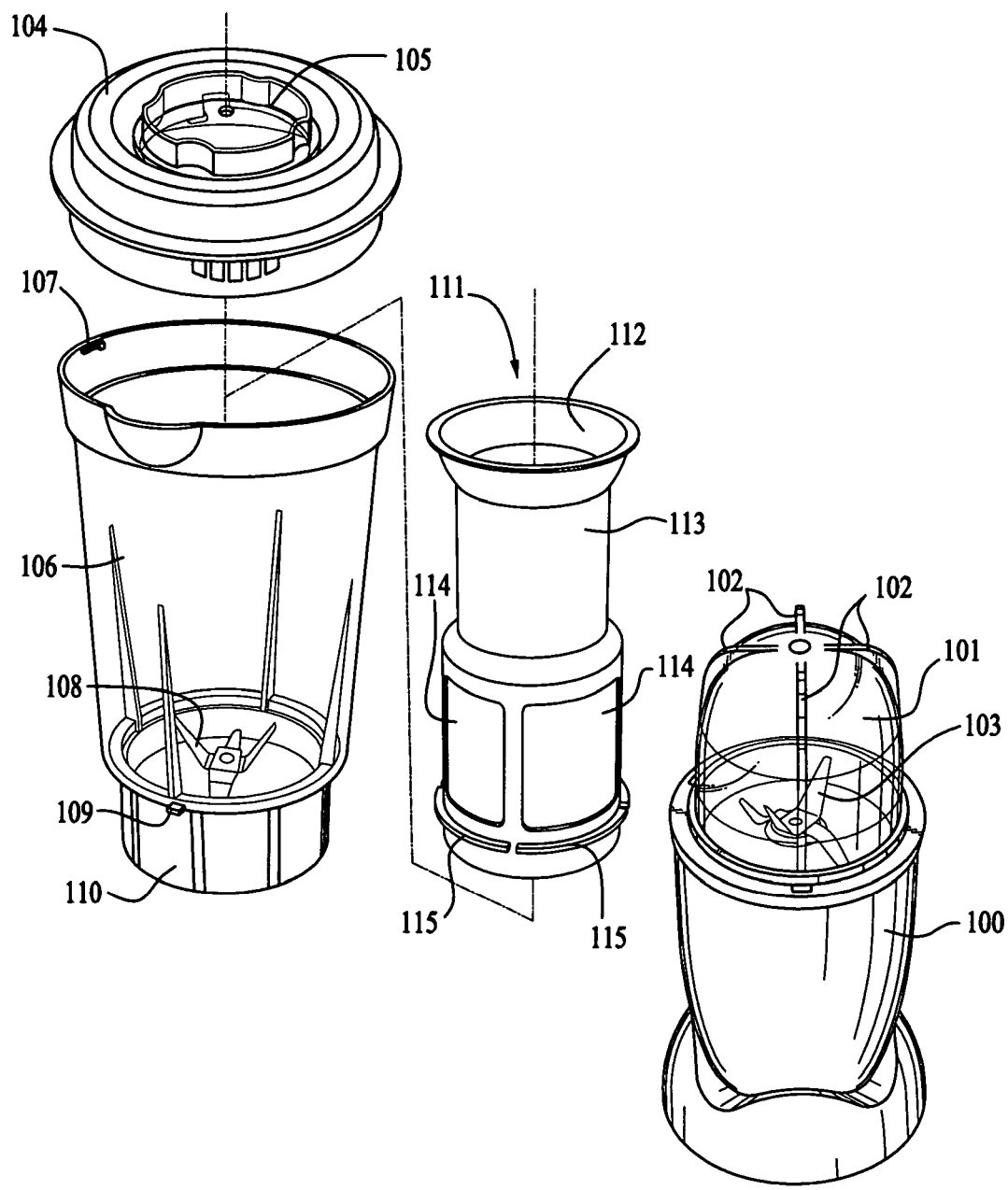
FIG. 1 is a perspective view of an exemplary embodiment of the blender system.

Turning to the drawings, FIG. 1 is directed to an exemplary embodiment of an individualized blender system. More specifically, FIG. 1 shows a container 101 engaged to a blender base 100 and a blender container 106. As shown in the exemplary embodiment of FIG. 1, the container 101 is a bullet-shaped container. As those skilled in the art will appreciate, the container 101 may have a plurality of shapes known or developed in the art. Also, the container 101 may include a plurality of ridges 102 provided on the outer surface of the container 101. The container 101 also includes a means for agitating 108 the contents of the container. The means for agitating 108 the container contents can be a blade element coupled to an impeller in a shaft or other transmission means. The blade element may have one, two, three, four, or more cutting elements. The cutting elements are generally flat members that may have sharpened edges, pointed tips, and one or more bends along the surface of the cutting elements.

The blender container 106 includes selectively removable lid 104, 105, and a base member 110 that is coupled to an agitating means 108. As shown in FIG. 1, the lid is composed of two components, but it is contemplated that a one-piece or multi-piece cap may also be used. The lid 104 may be locked on to the opening of the container 106 via a cap-locking member 107. The cap-locking member 107 may be an L-shaped ridge located at the lip of the container 106. The cap-locking member 107 engages a corresponding member (not shown) on the lid 104 in order to securely fix the lid 104 to the container 106.

According to one exemplary embodiment, the blender container 106 may include a juicer element 111. The juicer element 111 is composed of a main body 113 and a plurality of sieve elements 114 spaced about the periphery of the main body 113. According to the exemplary embodiment depicted in FIG. 1, the juicer element 111 may also include a funnel 112 at one end of the main body 113. Additionally, the juicer element 111 may also include an annular stop member 115 positioned at one end of the juicer so as to prevent over-insertion of the juicer element 111 into the blender container 106.

Figure 2A:
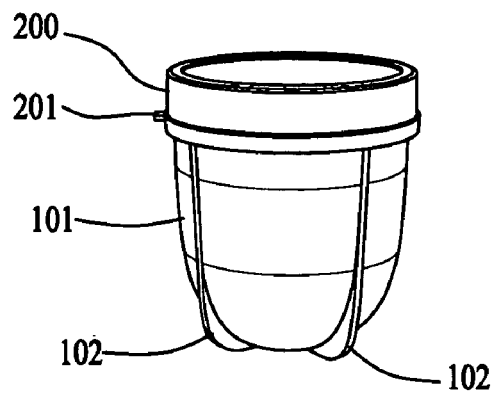
FIG. 2A is a perspective view of an exemplary embodiment of an individualized blender container.
Figure 2B:
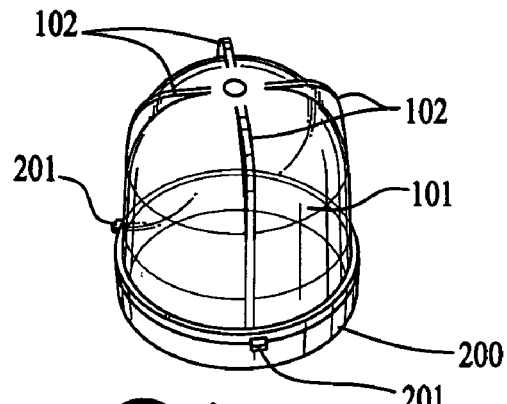
FIG. 2B is an exploded perspective view of FIG. 2A.
Figure 2C:
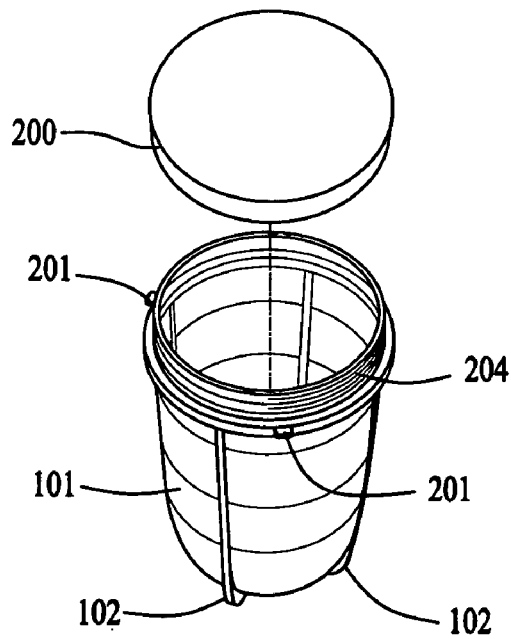
FIG. 2C is an inverted perspective view of FIG. 2A.

FIGS. 2A through 2C illustrate various views of the individualized container 101. That is, an individualized container 101 is sized for smaller servings that would be prepared/consumed by one and/or a few individuals. As shown in FIG. 2A, the container 101 is resting on external ridges 102. The external ridges 102 are shaped so as to permit the container 101 to rest on the apex of the container 101 without tipping over. As those skilled in the art will appreciate, the number of ridges 102 may be varied from what is depicted so long as the container 101 can stand upright on a substantially flat surface. As shown in FIG. 2A, the container 101 may be used as a drinking vessel. That is, an individual may blend contents of the container 101, remove the container 101, base 100, access the contents of the container, and secure the cap 200 onto the container 101 to store for later use.

Figure 2D:
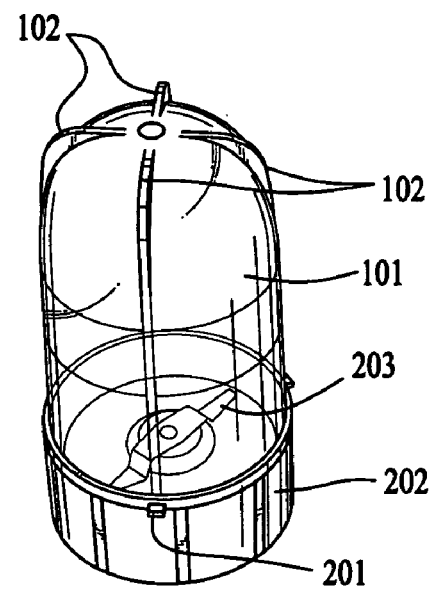
FIG. 2D is a perspective view of another exemplary embodiment of an individualized blender container.

In one configuration, the container 101 may be also enclosed with a cap 200. In an alternate configuration, the container 101 may be enclosed with a base 202 having an agitating means 203 as shown in FIG. 2D. As shown in FIG. 2C, the cap 200 may be affixed to the opening of the container 101 by threads 204. As those skilled in the art will appreciate, the cap 200 may be secured to the container 101 by various known and developed means such as, but not limited to, a friction fit or a snap-fit. As shown in FIG. 2B, the container 101 is inverted and may rest on the cap 200.

FIG. 2D illustrates an alternate embodiment of the container 101 having a larger volume as compared to the embodiments depicted in FIGS. 2A–2C. Also, the base 202 includes another exemplary embodiment of an agitating means 203. Additionally, as shown in FIGS. 2A through 2C, the container 101 includes locking members 201 that are spaced about the periphery of the container 101. The locking members 201 allow the user to operate the blender without requiring the constant application of force to the container (in order to keep the motor means switched on).

FIG. 3 is directed to the base 100 and the various components that are associated with the base's recessed well 300. The base 100 includes a motor means (not shown) that is coupled to an impeller 301. The impeller 301 includes a plurality of blades 303 that radiate from the center of the impeller 301. Along the periphery of the recessed well 300, a plurality of bushings 305 may be placed about the periphery of the recessed well 300. In another exemplary embodiment of the base 100, the base does not include the bushings 305. The bushings 305 may be made from a generally resilient material such as, but not limited to, rubber or silicone that may serve to reduce the vibrations during the agitation of the container contents. Also, as shown in FIG. 3, the recessed well 300 includes a plurality of pressure-activated switches 302. In use, the weight of the container 101 or the blender container 106 causes the downward movement of the switch 302 thereby activating the motor means. As shown in FIG. 3, a locking groove 304 may be provided adjacent to the switch 302. Accordingly, in use, when the locking members 201 contact and depress the switch 302, the container 101, 106 may be rotated such that the locking member 201 engages the locking groove 304. That is, as shown in FIG. 6, when a force $F_1$ is applied to the switch 302, the switch 302 moves downward. This downward motion causes the cam 600 on the switch 302 to contact a switching means 501 that is connected to the motor 500 thereby powering the motor. Accordingly, depending on the intended use or application, the container 101, 106 may be depressed to activate the motor 500 for short periods of time. Alternatively, the container 101, 106 may be depressed and rotated slightly so as to allow the locking members 201 to engage the locking groove 304 to permit the continued operation of the motor 500 without requiring the user to exert constant pressure to keep the motor powered.

Figure 10:
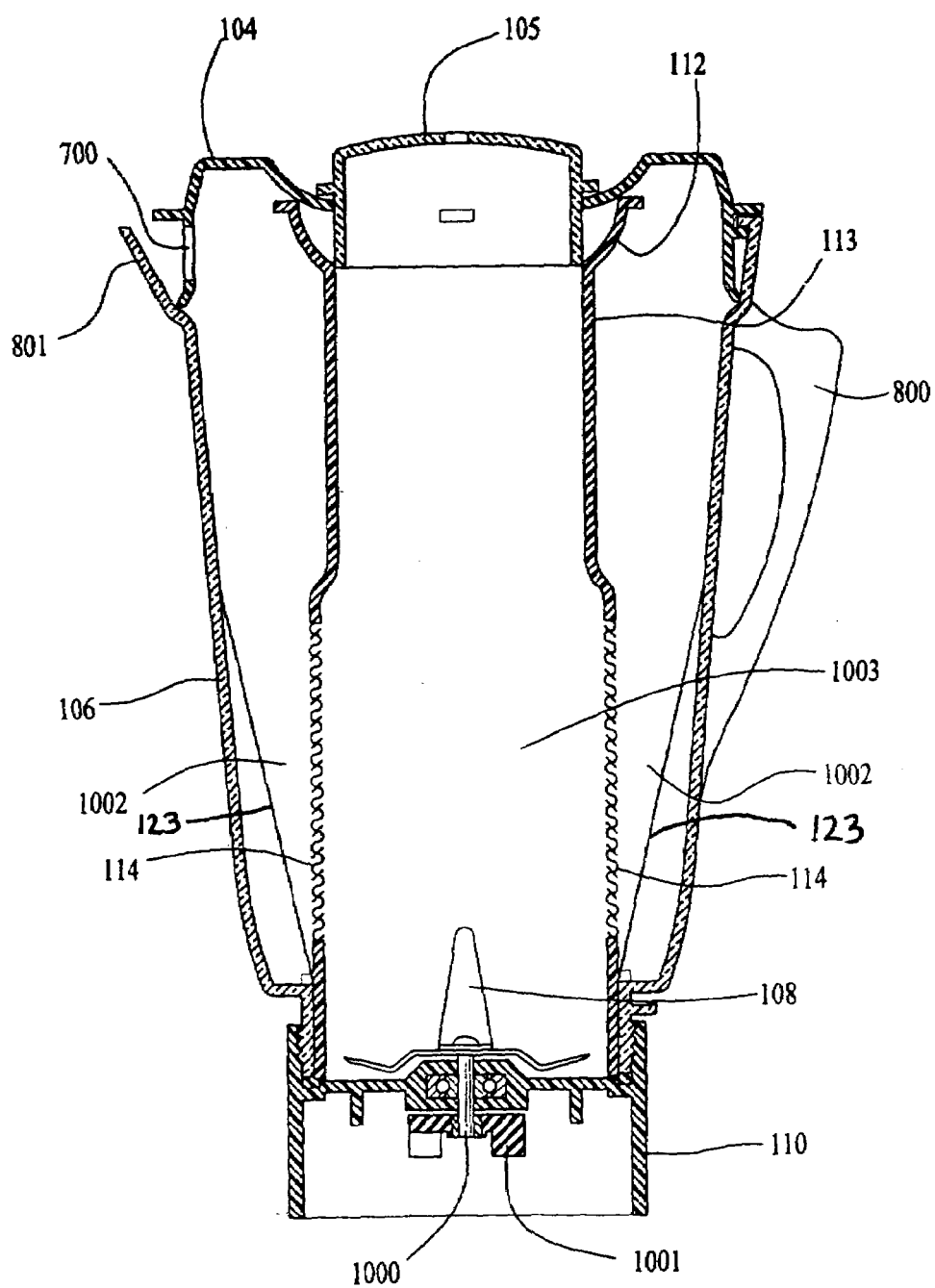
FIG. 10 is a cross-sectional view of an exemplary embodiment of blender container taken along line 10—10 of FIG. 7.

FIG. 7 is directed to an exemplary embodiment of the blender container 106. The blender container 106 comprises a main body that defines a volume and a lid 104, 105 that is affixed thereto. The lid includes a plurality of openings 700 that may be used to decant the contents of the container 106 while the lid 104 remains affixed to the container 106. The blender container 106 also includes a base 110, and a plurality of generally elongated ridges 123 integrally formed on the interior of blender container 106, as generally depicted in FIGS. 7, 10. The base 110 is sized to fit within the recessed well 300. Also, the base 110 is coupled to the container 106 by a screw-fit relation. The base 110 also includes an agitating means 108, as shown in FIG. 9. Turning back to FIG. 7, the blender container 106 also includes a plurality of locking members 109 spaced about the periphery of the blender container 106 near the base 110 of the container 106. As shown in the exemplary blender container 106 depicted in FIG. 7, a juicer 111 may be provided within the body of the blender container 106. As those skilled in the art will appreciate, the blender container 106 may be used without the juicer 111. The blender container 106 may include a handle 800 and a spout 801 that facilitates the decanting of the contents of the container.

FIG. 10 illustrates the cross-sectional view of the blender container 106. The cross-sectional view shows the juicer element 111 placed within the body of the blender container 106. As shown in FIG. 10, the juicer element 111 is secured to the bottom of the blender container 106. Additionally, the bore of the juicer 111 may be accessed by removing cap element 105. In use, fruits and/or vegetables may be placed into the bore 1003 of the juicer 111. Rotation of the motor means is transmitted through shaft 1000 and mating impeller 1001 thereby transmitting a rotational force to the agitating means 108. The contents of the juicer 1003 are then blended thereby causing the resulting juice to move from the bore 1003 into the container body 1002 through the sieve elements 114. The remaining pulp is separated and trapped within the bore 1003 of the juicer 111. By providing a two-part cap 104, 105, an individual user can access the bore 1003 of the juicer 111 without removing the entire cap or stopping the machine for fear of spillage or splattering. For example, the individual user may remove cap 105 to access the bore 1003 of the juicer 111 to add more products for juice extraction. The resulting juice that is located within the space 1002 may be decanted from the container without removing the lid through the openings.

Figure 11:
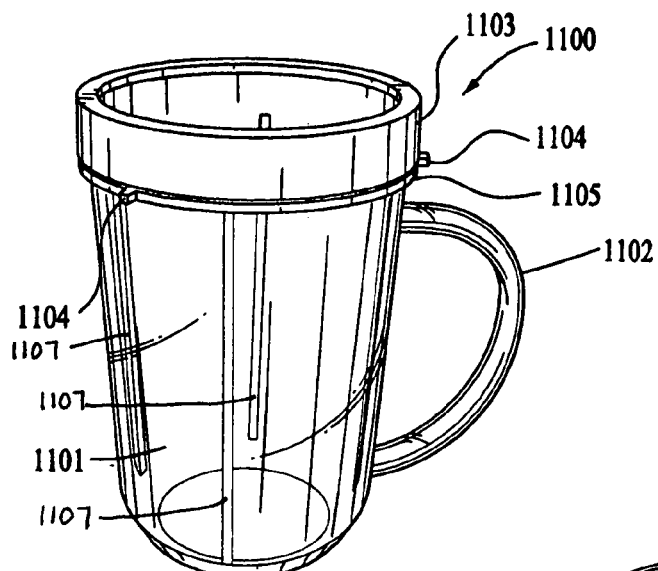
FIG. 11 is a perspective view of one embodiment of a mug that may be used with the blender.

FIG. 11 illustrates one embodiment of a mug-type container 1100. The container 1100 includes at least one wall 1101 that defines a fluid containing area. As shown in the figure, the wall 1101 may be slightly tapered when moving from the mouth of the container 1100 to the base of the container 1100. The container 1100 also includes means for grasping or holding the container 1102. In another embodiment, the means may be a handle 1102, which is fixed to the outer wall 1101. In one embodiment, the handle 1102 is a generally U-shaped.

Container 1100 also includes a plurality of locking members 1104 that are positioned about the periphery of container 1100. In one embodiment, locking members 1104 are protuberances that extend substantially perpendicular from wall 1101 of container 1100. Also as shown in FIG. 11, locking members 1104 may have a generally rectangular shape. As those skilled in the art will appreciate, locking members 1104 may have a plurality of different shapes. Container 1100 further includes a plurality of substantially elongated ridges 1107 (FIGS. 11–12, 14) integrally formed on the interior wall of the container body. Ridges 1107 facilitate the blending of the contents of container 1100.

Figure 12:
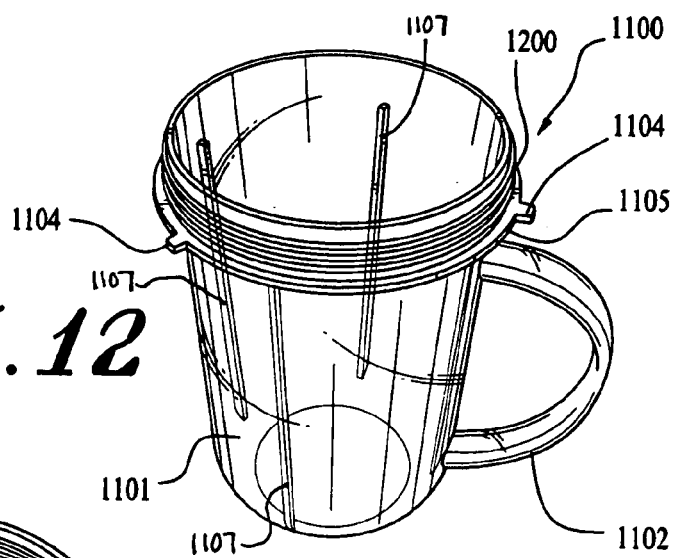
FIG. 12 is a perspective view of the embodiment of FIG. 11 with an exemplary embodiment of a ring removed from the mug.

As shown in FIG. 12, the container 1100 is provided with a plurality of threads 1200 on the outer wall 1101 that allow the ring 1103 to be coupled to the container 1100. As shown in the embodiment depicted in FIG. 11, the members 1104 may be coupled to a ring-shaped ridge 1105. The ridge 1105 may also serve as a stop so that the ring 1103 is not over threaded beyond the opening of the container 1100.

Figure 13:
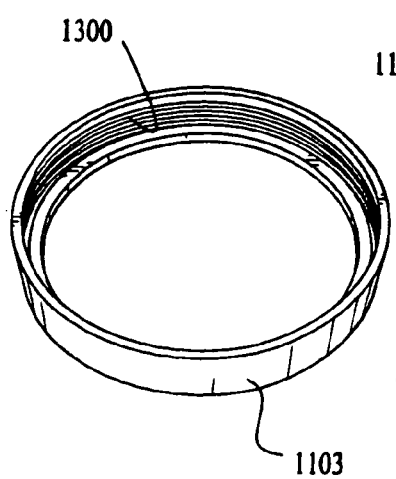
FIG. 13 is a bottom perspective view of ring of FIG. 12.

The container 1100 may also include a ring 1103 that is positioned atop the mouth of the container 1100. The ring 1103 may be fixed to the container 1100 via threads or other coupling means known or developed in the art. FIG. 13 shows one embodiment of the ring 1103 that may be coupled to the mouth of the container 1100. In one embodiment, the ring 1103 is a generally cylindrical wall having an outer surface and inner surface. The ring 1103 may include a plurality of threads 1300 that are found on the inner surface of the ring 1103. In another embodiment, the ring 1103 includes a top surface or lip that is coupled to the wall of the ring 1300. The ring 1103 may be coupled over the threads 1200 of the container 1100 so that it is easier for an individual to drink from the container 1100.

may be coupled over the threads 1200 of the container 1100 so that it is easier for an individual to drink from the container 1100.

FIG. 14 illustrates one exemplary embodiment of container 1100 being fixed to base member 110. Specifically, container 1100 is inverted and threadedly coupled to base member 110. The coupled container 1100 may then be inserted into the recess well 300 of blender base 100. As shown in FIG. 14, the base of container 1100 is slightly tapered at 1400. The taper of container 1100 creates a dome-like structure that facilitates the blending of the contents of container 1100.

FIGS. 15 and 16 illustrate exemplary embodiments of a container cap 1500, 1600, respectively, that may be coupled to a container 101, 1100. The cap 1500, 1600 contains a generally planar top surface 1502, 1103 and at least one sidewall 1503, 1604. According to various embodiments, the tops 1002, 1603 of the container cap 1500, 1600 and the sidewalls 1503, 1604 are generally perpendicular to one another. As those skilled in the art will appreciate, the caps 1500, 1600 may secure to the containers 101, 1100 by a coupling means. In another embodiment, the coupling means may be ridges for a snap fit. In one embodiment, a plurality of threads (not shown) may be provided on the inner surface of the wall 1503, 1604. The threads are sized to engage the threads that are on the plurality of the containers 101, 1100 that are described herein.

As shown in FIG. 15, the container may include a plurality of openings 1501 that are spaced about the top of the container cap 1500. The openings 1501 may have varying sizes, shapes, and density on the cap 1500. As shown in FIGS. 15 and 16, these openings 1501, 1601, 1602 are generally circular in shape. As those skilled in the art will appreciate, these openings 1501, 1601, 1602 may have a plurality of different shapes know or developed in the art. Furthermore, the clustering or density of the openings on the cap 1500, 1600 may be varied depending upon intended use of the container cap 1500, 1600. For instance, the cap 1500, as shown in FIG. 15, may be used for shaking out large or coarse items that are contained within the container 1500. In FIG. 16, the openings 1601, 1602 being in closer proximity to each other may be useful for those blended items that have a smaller diameter or that may be poured or strained out of the container 1100.

In closing, it is understood that the embodiments described herein are merely illustrative of the principles of these varying embodiments. Other modifications that may be made are within the scope of these embodiments described herein. Thus, by way of example, but not of limitation, alternative configurations may be utilized in accordance with the teachings herein. Accordingly, the drawings and description are illustrative and not meant to be a limitation thereof.

What is claimed is:

1. A blender system, comprising:
   a base having a means for rotating a shaft, a recessed well positioned at a top of the base, a pressure-actuated switch positioned about the periphery of the recessed well, and one or more locking grooves;
   a container comprising an opening at one end and a base at a second end, the body being tapered at the second end; a handle coupled to an exterior of the body; one or more locking members in spaced relation about a periphery of the opening of the body, wherein the locking members are engageable with the locking grooves;
   a ring selectively attachable and removable from the periphery of the opening; and
   a means for agitating contents of the container, the means selectively attachable and removable from the opening of the body.

2. The blender system of claim 1 further comprising a lid having a generally planar top and a wall coupled to a periphery of the top, the top having a plurality of openings, and wherein the lid is selectively attachable and removable from the opening of the container.

3. The blender system of claim 1 wherein the container further comprises one or more threads positioned on the periphery of the opening.

4. The blender system of claim 3 wherein the ring comprises at least one wall and a lip coupled to a top of the at least one wall.

5. The blender system of claim 1 wherein the container further comprises one or more ridges positioned on an interior of the body.

6. The blender system of claim 1 wherein the agitating means comprises a mixer base and one or more blades rotatably coupled to the mixer base.

7. A blender system, comprising:
   a base having a means for rotating a shaft, a recessed well positioned at a top of the base, a pressure-actuated switch positioned about the periphery of the recessed well, and one or more locking grooves;
   a container comprising an opening at one end and a base at a second end, the body being tapered at the second end; a handle coupled to an exterior of the body; one or more locking members in spaced relation about a periphery of the opening of the body, wherein the locking members are engageable with the locking grooves; and one or more container threads positioned about the periphery of the opening;
   a ring comprising at least one ring wall and a lip, the lip coupled to a top of the at least one ring wall, the ring wall having one or more ring threads positioned on an interior portion the ring wall, the ring threads, selectively attachable and removable from the container threads;
   a means for agitating contents of the container, the means selectively attachable and removable from the container threads; and
   a lid having a generally planar top and a lid wall coupled to a periphery of the top, the top having a plurality of openings, and wherein the lid is selectively attachable and removable from the container threads.

8. The blender system of claim 7 wherein the agitating means comprises a mixer base and one or more blades rotatably coupled to the mixer base.

9. The blender system of claim 7 wherein the openings on the lid are positioned on a portion of the lid.

10. The blender system of claim 7 wherein the lid further comprises one or more threads positioned on an interior of the lid wall.

11. The blender system of claim 7 wherein the container further comprises one or more ridges positioned on an interior of the body.

* * * * *